(12) United States Patent
Bolin et al.

(10) Patent No.: US 7,570,615 B2
(45) Date of Patent: Aug. 4, 2009

(54) RESOURCE-SHARING CELLS

(75) Inventors: Johan Bolin, Uppsala (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1090 days.

(21) Appl. No.: 10/964,829

(22) Filed: Oct. 15, 2004

(65) Prior Publication Data

US 2005/0113112 A1 May 26, 2005

Related U.S. Application Data

(60) Provisional application No. 60/512,201, filed on Oct. 20, 2003.

(30) Foreign Application Priority Data

Feb. 17, 2004 (SE) .................................... 0400389

(51) Int. Cl.
*H04Q 7/00* (2006.01)
(52) U.S. Cl. ................ 370/329; 370/330; 370/341; 370/342; 370/335; 370/442; 370/444; 455/450; 455/452.1; 455/447; 455/562.1; 455/575.7; 455/456.5; 342/457
(58) Field of Classification Search ............... 370/329, 370/335, 341, 342, 332, 437, 331; 375/133; 342/457; 455/437, 439, 561, 562.1, 575.7
See application file for complete search history.

(56) References Cited

U.S. PATENT DOCUMENTS

| | | | | |
|---|---|---|---|---|
| 5,513,176 A | * | 4/1996 | Dean et al. | 370/335 |
| 5,673,259 A | * | 9/1997 | Quick, Jr. | 370/342 |
| 6,011,789 A | * | 1/2000 | Schilling | 370/342 |
| 6,034,635 A | * | 3/2000 | Gilhousen | 342/457 |
| 6,058,317 A | | 5/2000 | Posti | |
| 6,115,608 A | * | 9/2000 | Duran et al. | 455/436 |
| 6,128,486 A | * | 10/2000 | Keskitalo et al. | 455/422.1 |
| 6,141,332 A | * | 10/2000 | Lavean | 370/335 |
| 6,195,046 B1 | * | 2/2001 | Gilhousen | 342/457 |
| 6,275,703 B1 | * | 8/2001 | Kalev | 455/436 |
| 6,493,331 B1 | * | 12/2002 | Walton et al. | 370/341 |
| 6,744,743 B2 | * | 6/2004 | Walton et al. | 370/318 |

(Continued)

FOREIGN PATENT DOCUMENTS

WO 02/087275 10/2002
WO 03/065757 8/2003

OTHER PUBLICATIONS

International Search Report and Written Opinion mailed Mar. 9, 2005 in corresponding PCT Application PCT/SE2004/001345.

*Primary Examiner*—Marceau Milord
(74) *Attorney, Agent, or Firm*—Nixon & Vanderhye P.C.

(57) ABSTRACT

A virtual network is created by providing antennas controlled by the same radio access station with control signals of virtual radio access stations. Sets of physical channels comprising the control signals are dedicated to the respective antennas, while sets of physical channels comprising only traffic channels constitute common resources for more than one antenna. One example embodiment is applied in antenna systems utilizing common antenna cables, whereby the radio access station is provided as a distributor having a central broadcast control signal injector and control signal selectors at the antennas.

26 Claims, 10 Drawing Sheets

U.S. PATENT DOCUMENTS

| | | | |
|---|---|---|---|
| 6,834,194 B2 * | 12/2004 | Hunzinger | 455/452.2 |
| 6,842,444 B2 * | 1/2005 | Bolgiano et al. | 370/335 |
| 7,016,331 B1 * | 3/2006 | Joo et al. | 370/334 |
| 7,171,164 B2 * | 1/2007 | Ylitalo | 455/67.16 |
| 7,194,275 B2 * | 3/2007 | Bolin et al. | 455/456.6 |
| 7,203,246 B2 * | 4/2007 | Ylitalo et al. | 375/267 |
| 7,359,350 B2 * | 4/2008 | Kato et al. | 370/329 |
| 2002/0193146 A1 * | 12/2002 | Wallace et al. | 455/562 |

* cited by examiner

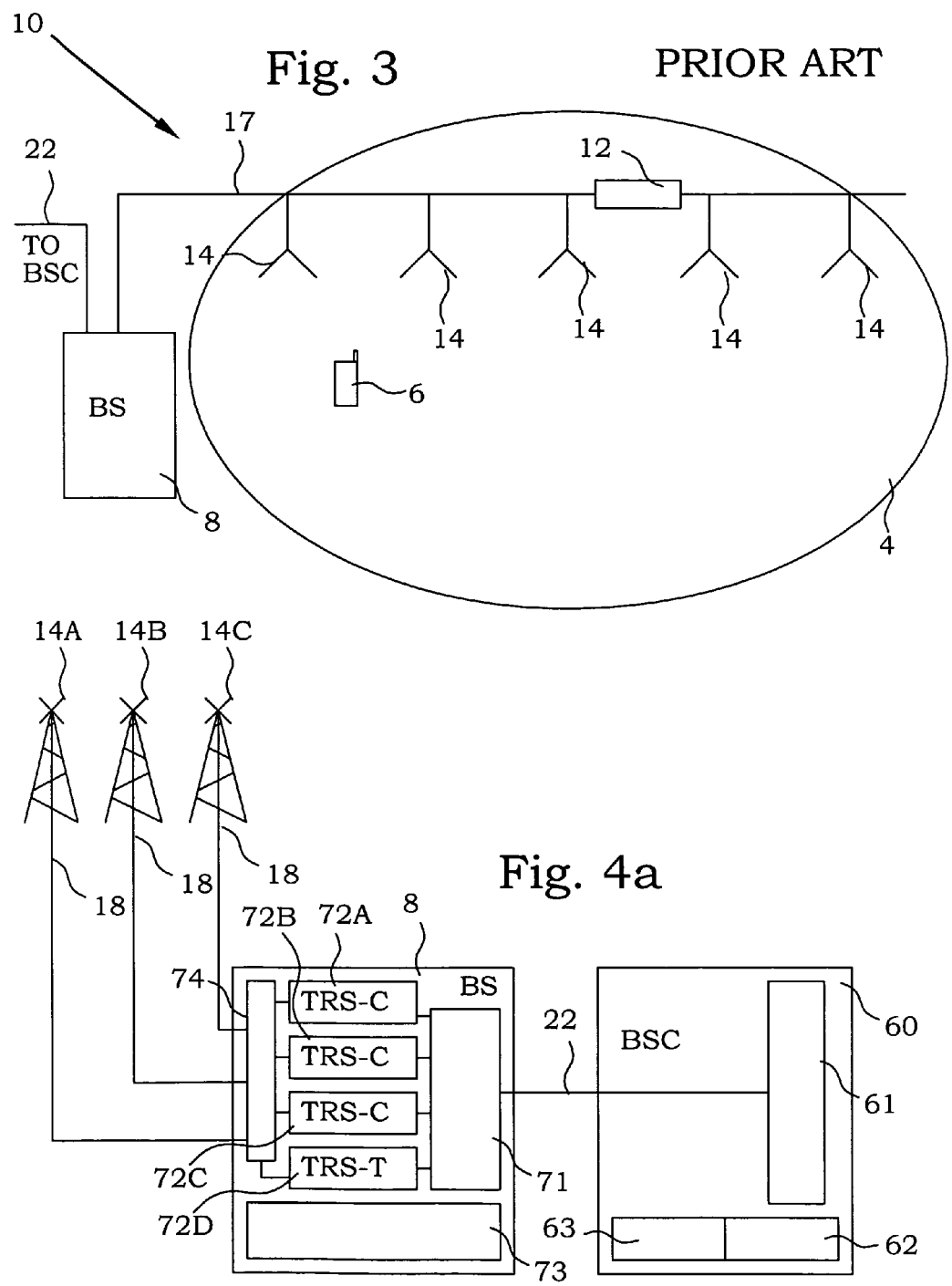

RESOURCE-SHARING CELLS

This application claims priority to and benefit of U.S. Provisional Application No. 60/512,201, filed 20 Oct. 2003 and Swedish application number 0400389-3 filed Feb. 7, 2004. The entire contents of these applications are incorporated herein by reference in its entirety.

TECHNICAL FIELD

The present invention relates in general to cellular communications networks.

BACKGROUND

The possibility to determine the position of a mobile device has enabled application developers and wireless network operators to provide location based, and location aware, services. Examples of those are guiding systems, shopping assistance, friend finder and other information services giving the mobile user information about their surroundings.

In addition to the commercial services, the governments in several countries have also put requirements on the network operators to be able to determine the position of an emergency call. For instance, the governmental requirements in the USA (FCC E911) require that it must be possible to determine the position of a certain percentage of all emergency calls. There is no difference between the requirements put on indoor environments compared to outdoor environments.

In outdoor environments, the position estimation can be done using external methods for position determination, e.g. GPS (Global Positioning System) based methods like Assisted-GPS (A-GPS). Position estimation can also be performed using the wireless network itself. Methods using the wireless network can be grouped in two main groups. The first group comprises methods that are based on the radio cell to which a mobile terminal is attached, e.g. by using Cell-ID or E-CGI (Enhanced Cell Global Identity). The second group uses measuring of radio signals from several base stations (BS) and determining the terminal position using e.g. Time Difference (TD).

In order to be able to connect to a mobile network or to perform handover when connected, a mobile terminal typically constantly measures available signals, not only from its own base station, but also from other base stations. These signals are typically control signals intended for measuring radio conditions of transmissions, which control signals contain, among other data, information about how to establish a connection to the transmitting base station. In particular, the control signals comprise data, which by itself or in combination with the frequency of the carrier on which the control signal was transmitted constitute base station identification data. A mobile terminal can thus obtain an identity of the transmitting base station and an estimate of the radio conditions. The mobile terminal typically compiles this information, in GSM (Global System for Mobile communications) in a neighbor list, which is transferred to the network as information.

Position estimation can be based on measurements in the neighbor list. One then uses the relation between the distance from the radio base station and the radio condition in combination with knowledge about the exact position of the base station. The base station positions are known within the communications network. This means that the neighbor list easily can be used for position estimating according to different algorithms. The accuracy of the position estimation is generally proportional to the size of the cell.

Triangulations, or Time Difference (TD) methods, use signals associated with two or more different base stations. These signals are used to calculate the position or at what distance from the base station a mobile terminal is located. The calculations are based on the relative or absolute difference in the time it takes the signal to propagate between the terminal and the different base stations. The achievable accuracy of TD-methods depends on system architecture, physical conditions and radio conditions. Typically, the accuracy of a TD method a mobile telephony system is 50 to 150 meters. TD methods are also relatively time and resource consuming.

Fingerprinting methods use the fact that all places have a, more or less, unique characteristic signature of the received radio signals. This is the result of multi-pathing and reflections in the buildings and obstacles. By storing the characteristic radio signature of different locations in a database, it is possible determine the location of a device by comparing the received signature of a signal with the signatures stored in the database. Fingerprinting methods require an always-updated database. A good result typically also relies on being able to match signals from several different sources or base stations.

A terminal located indoors typically has a connection to a base station covering the surrounding outdoor area that is of lower quality than if the terminal would have been located outdoors. To improve the indoor coverage situation, many larger buildings are equipped with an indoor mobile telephony system. The indoor system most often consists of one base station and a distributed antenna system or a leaking cable antenna. For buildings spread over large areas repeaters are typically used. This results in the entire building appearing as one large radio cell making it impossible to determine where the terminal is located within the building. Furthermore, due to weak signals from base stations located outdoors, more sophisticated methods using, e.g., triangulation, are normally not practical to apply.

One solution is to use an additional system for positioning, a system that is not based on any mobile telephony system. This can be an indoor GPS system, a WLAN (Wireless Local Area Network) or a Bluetooth based system or some other sensor solution. However, such systems require additional complex equipment, and also the terminals have to be equipped with special hardware and/or software, which makes the solution expensive.

Another solution is to increase the number of indoor base stations, thus reducing the size of the cells. Such a solution will also increase the total available communication resources, since there typically are possibilities for more efficient reuse of communication resources. However, a base station is an expensive piece of equipment and such a solution will therefore be very costly. If the desire of an improved position determination is the only reason for increasing the number of base stations, the investments are typically unreasonably high.

Furthermore, when dividing a large cell into smaller cells, the number of available carrier frequencies in each small cell is typically a fraction of the available carrier frequencies in the large cell corresponding to the reuse factor. For situations, where the traffic intensity varies significantly with time and/or between different small cells, the dynamics of the resource allocation is detrimentally reduced.

SUMMARY

A general problem is that there is a difficulty to increase position estimation accuracy without significantly increased investment costs for small cell radio access stations. Another problem is that division of a large cell into smaller cells typically induces reduced dynamics in the resource allocation.

An object is to provide methods and devices for improved position estimation accuracy. A further object is to provide such methods and devices that do not unreasonably increase the investment costs for radio access stations. Another further object is to provide such methods and devices allowing an improved resource allocation dynamics.

The above objects are achieved by methods and devices according to the enclosed patent claims. In general, a virtual network is created by providing antennas controlled by the same radio access station with control signals of virtual radio access stations. Sets of physical channels comprising the control signals are dedicated to the respective antennas, while sets of physical channels comprising only traffic channels constitute common resources for more than one antenna. Preferably, the present technology is applied in antenna systems utilizing common antenna cables, whereby the radio access station is provided as a distributed means having a central broadcast control signal injector and control signal selectors at the antennas.

An advantage is that the virtual network provides a smaller cell structure that can be utilized for improving position determinations. However, the common radio access station makes it possible to reduce the investments since many aspects of the virtual cells can be managed by common functionalities in the radio access stations. The dynamics in resource allocation is maintained due to the use of common sets of physical channels used as traffic channels.

BRIEF DESCRIPTION OF THE DRAWINGS

FIG. 3 is a schematic illustration of a distributed antenna system according to prior art;

FIG. 4a is a schematic illustration of a part of a radio network according to an example embodiment;

FIG. 4b is a schematic illustration of a multiplexor used in FIG. 4a;

DETAILED DESCRIPTION

In A short review of control signaling and general position estimations in cellular networks is given.

In the main part of the detailed description, systems based on GSM technology are used as exemplifying embodiments. However, the basic ideas are not limited to the specific described example embodiments, but are generally applicable to many different cellular communication systems.

The managing method is primarily targeting managing in cellular mobile radio systems. GSM is the mobile radiotelephony standard used in the example embodiments presented in this disclosure. However, the present technology is also applicable on other cellular mobile radio systems and their related standards, such as e.g. other radio standards based on TDMA (Time Division Multiple Access), CDMA (Code Division Multiple Access), Wideband CDMA (WCDMA) and TDD (Time Division Duplex) technology.

In the above described GSM-based embodiments, the base station is the radio access station used in GSM. Likewise, the base station controller is the GSM example of a radio access station controller. In other systems, similar types of nodes exist, but sometimes under somewhat different names. In WCDMA for example, access points and radio network controllers correspond to radio access stations and radio station access controllers, respectively. In 3G applications, the base station is typically denoted "node B". In the present disclosure, "radio access station" is intended to comprise all different types of base stations, node B's, access points etc. according to the used communication method.

In the described GSM-based embodiments, the time slot constitutes a physical channel. The physical channel is the smallest part of a radio resource that can be allocated to a single particular user. A carrier frequency can thereby be seen as a set of time slots (or physical channels) that all are available for use by a particular base station. The base station can also have access to more than one frequency carrier, i.e. to more than one set of physical channels.

In WCDMA, the physical channel is characterized by a particular code, typically a combination of a scrambling code and a channelisation code. Each access point can typically use physical channels having a particular scrambling code, in principle independent of the used channelisation codes. The naturally defined set of physical channels available for use by a particular radio access station is in WCDMA characterized by a particular scrambling code.

Also in other cellular communications systems, there is a smallest allocable resource unit, in the present disclosure called a physical channel. Each radio access station typically has access to a certain set of physical channels, predefined during cell planning or not. The principles regarding carriers and time slots in the above embodiments are therefore generally applicable to sets of physical channels and the physical channels themselves.

Figure 1A:
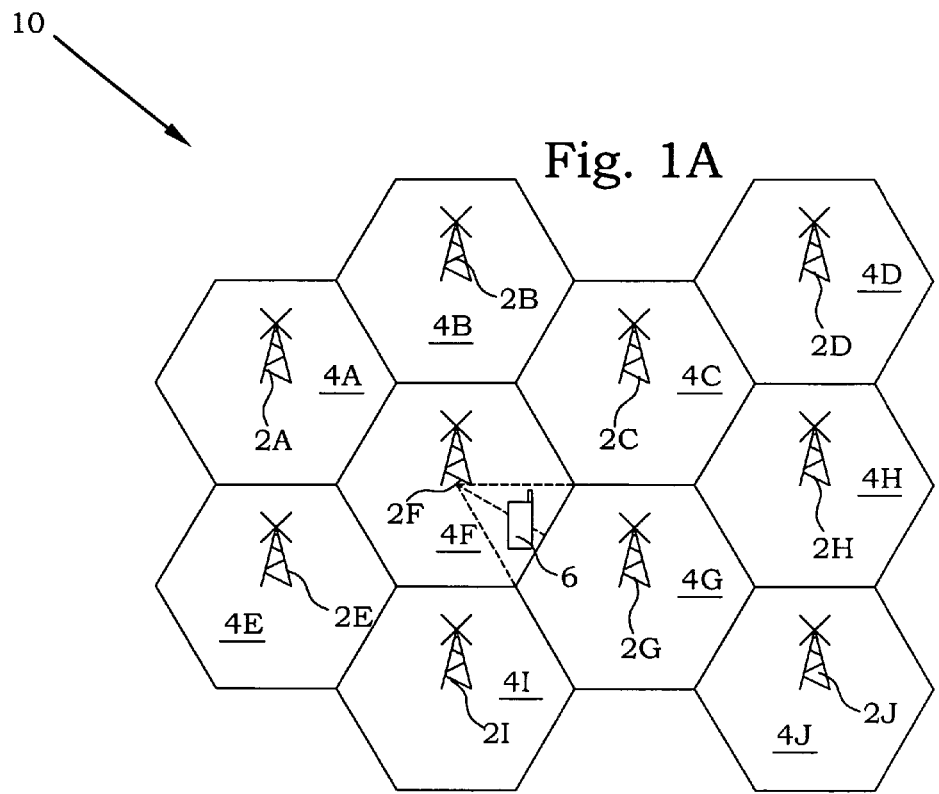
FIG. 1A is a schematic illustration of a cellular communications system.

The basic idea with cellular networks 10, one of which is schematically illustrated in FIG. 1A, is to structure the network as a grid of cells 4A-J where each cell 4A-J is the area covered by one radio base station 2A-J. The communication takes place via different radio resources. To avoid interference between mobile phones 6 and radio base stations 2A-J in neighboring cells, the communication between the mobile phone 6 and the base station 2A-J uses different resources or communication channels, i.e. slightly different configurations or settings, e.g. of frequencies or codes. The number of those resources or "configurations" is limited. In GSM systems, the resources are formed by a limited number of allowed carrier frequencies, and they are used to separate communication in different cells. In WCDMA (Wideband Code Division Multiple Access) systems, the resources are characterized by a limited number of different codes. The result of the limited number of radio resources means that it is important to plan the network 10 carefully.

Mobile Station (MS), Mobile Phone, Mobile Terminal and Handset all refer to the device that is movable within area covered the communications system. These terms will be used in the present disclosure as equivalent expressions. This device is typically a mobile telephone, hand held computer, a so-called Personal Digital Assistance (PDA), or other device or apparatus equipped with a radio transceiver for cellular or mobile networks.

Figure 1B:
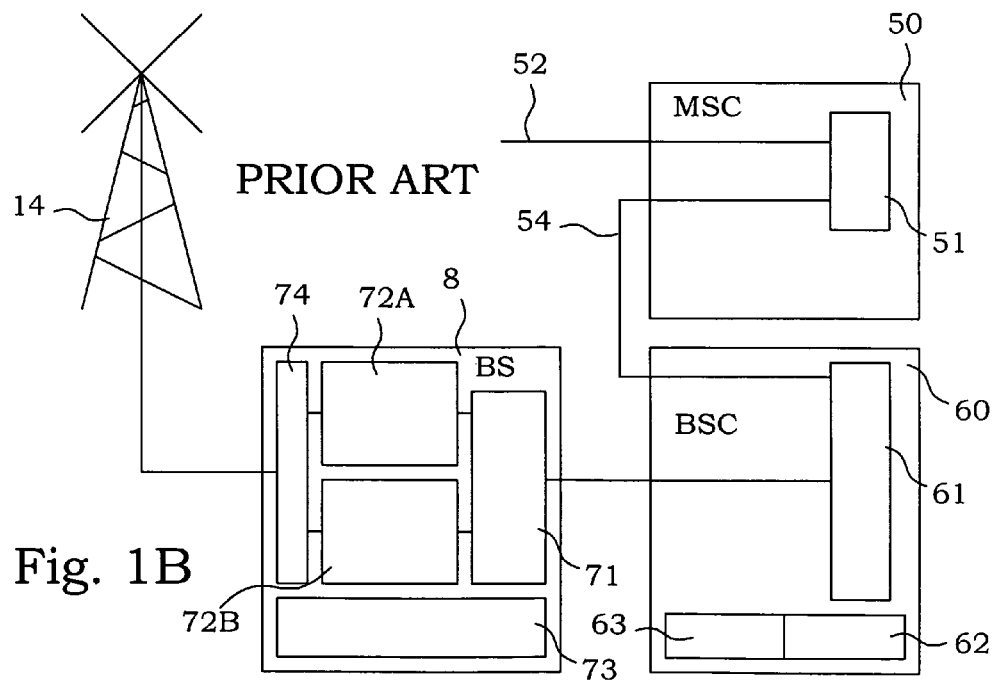
FIG. 1B is a block scheme of connecting network elements in a cellular communications system.

In FIG. 1B, a block scheme of network elements in a typical GSM network is illustrated. An MSC (Mobile services Switching Center) 50 is connected to other MSC's and to other external networks 52, typically via a (not shown) GMSC (Gateway MSC). The MSC 50 is connected to one ore more BSC's (Base Station Controllers) 60, and has a switch 51 for connecting different network elements connected thereto. The BSC 60 is responsible for handling one or more base stations 8, and switches traffic to and from the MSC 50 and different base stations 8 by switching functionalities 61. The BSC 60 has also means 62 for conducting handovers and means 63 for performing estimations of positions of mobile terminals connected to the base stations 8, e.g. by utilizing neighbor lists reported by the mobile terminals. Alternatively, the means 63 for estimating positions can be arranged for reporting information associated with position determination to another node in the network, where the actual estimation is performed. The base station 8 comprises a transceiver radio interface 71, which divides traffic of the different channel frequencies to transceiver units 72A, 72B. The output of the transceivers 72A, 72B are multiplexed by a multiplexor 74 and sent to an antenna 14. The functions in the base station 8 are controlled by a base station control system 73.

Figure 1C:
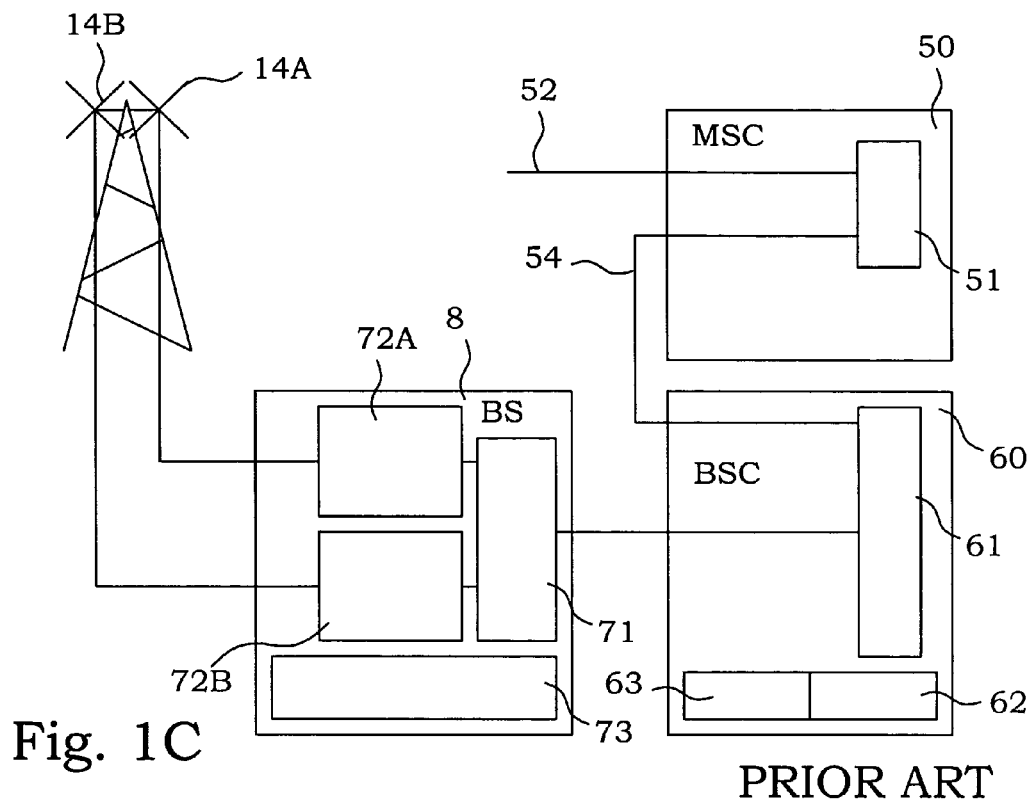
FIG. 1C is a block scheme of connecting network elements in a sectored cellular communications system.

In FIG. 1C, a block scheme of network elements in a GSM network having sectorized antennas is illustrated. Most parts are similar as in FIG. 1B and are therefore not further discussed. The base station 8 comprises two transceiver units 72A, 72B. The base station 8 serves two sectorized antennas 14A, 14B arranged at the same radio pylon. The output of each one of the transceivers 72A, 72B is connected to a respective antenna 14A, 14B. The base station 8 here controls two antennas 14A, 14B with a lot of common functionalities. However, the available carriers are divided between the antennas 14A, 14B.

Communication using cellular communications systems typically involves data signals and control signals sent on traffic channels and control channels, respectively. In a GSM system, there are three classes of control channels. BCH (Broadcast Channel) comprises channels on which information about the cell and network parameters continuously are transmitted to the mobile terminals. For instance, the channel BCCH (Broadcast Control CHannel) is used for sending cell specific information. Communication on channels of the BCH takes place in the DL (DownLink) direction. The BCH data is provided by the base station 8.

Other control channels are used for paging purposes, access functionalities and signaling between network and mobile terminal before and during calls. Such control signaling is e.g. used by the mobile terminals to inform the network about e.g. measurements of neighbor transmitters. Also signaling concerning authentication are performed by such control signaling. For CCCH (Common Control Channels) and DCCH (Dedicated Control Channels), the information is typically provided from or to a BSC or MSC and is only relayed through the base station.

Returning to FIG. 1A, in most cellular networks 10, the mobile terminal 6 continuously measures the receiving conditions of the radio signals. The reasons are several. One is to be able to modify the transmission power in order to avoid sending on unnecessary high transmission power. In general, but not necessarily, the radio base station with the best radio conditions is the one used for connection to the cellular network. The base station with the best radio conditions is in most cases also the one that is located closest to the mobile telephone 6. In FIG. 1A, the mobile telephone 6 is connected via base station 2F. The mobile telephone 6 is thus located within the cell 4F of that particular base station 2F. The radio cell is defined as the area surrounding a base station, in which the base station is the base station with the best radio connection to a mobile telephone. Since the positions of the transmission points associated with the base stations are known by the cellular network, the identity of the base station with the best radio conditions hence also gives an approximate location estimate of the mobile telephone. The size of a cell is proportional to the density of base stations. In FIG. 1A, one may therefore conclude that mobile telephone 6 is present within cell 4F.

In order to know which base station to connect to, the mobile telephones constantly measure signals sent also from other base stations. These signals are special control signals intended for measuring the radio conditions between the mobile telephone and the base stations. The signals contain, among other data, information about how to establish a connection to the base station sending the signal. As mentioned above, the communications in neighboring cells are done over links with slightly different configurations in order to avoid interference. The control signals are typically transmitted using those different configurations. As an example, in GSM, the control signal from one base station is sent on a different frequency than the control signal sent from the neighboring base station. However, base stations further away could use the same frequency in a reuse pattern. To be able to separate the base stations associated with different cells, but that are sending control signals on the same frequency, from each other, the control signals also contain other information making is possible to distinguish a control signal from one base station from the other. This information, alone or in combination with the frequency of the control signal, gives a possibility to identify a particular base station. In other words, the control signals comprise base station identification data. In GSM, so-called color codes are used to separate different base stations from each other.

The network typically informs the mobile terminal about which base stations that are present in the vicinity. The mobile telephone then knows what control signals to look for. The mobile telephone may also measure signals from each other base stations if the information to be measured is not accessible. This could be the case e.g. in areas where a user's operator has no coverage, but other operators have. The results of the measurements of the control signals sent from the base stations are typically stored in the mobile terminal in a compiled manner. Such a list of neighboring base stations or at least data corresponding to such a list is kept updated in the mobile terminal, and often referred to as the neighbor list.

Figure 2:
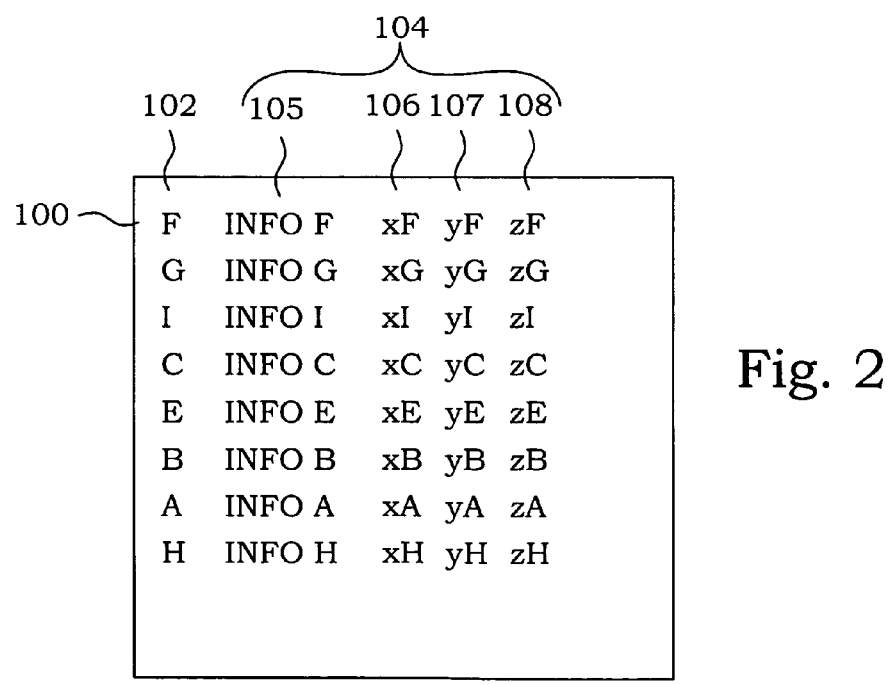
FIG. 2 is an illustration of a typical content of a neighbor list.

An example of such a neighbor list for the situation of FIG. 1A is illustrated in FIG. 2. The list is sorted based on the quality of the radio conditions, with the base stations having the best radio conditions on top of the list. Each row 100 of the list refers to one particular base station. In this example, the first column 102 comprises an identity of the base station. A second portion 104 comprises additional information. In the present embodiment, a second column 105 comprises general information. The third to fifth columns 106-108 comprise data associated with e.g. measures of the quality of the radio conditions to each base station, signal quality, barring flags or similar data important for handover decisions.

The measurements of such a list are continuously transferred to the base station to keep the network updated regarding radio conditions. The base station, or any network server connected to it can thereby retrieve the content of a neighbor list of any connected mobile terminal.

In the present disclosure, the expressions "position" and "location" will be used. Position is intended to mean a geographical position given as coordinates or degrees (e.g. the WGS-84 datum). It may also contain 0.20 orientation and/or heading, speed, acceleration etc. A position may also be given as a relative measure. The location is a more subjective position defined by the type of (or relation to) facility or place. Examples of locations are: "military area/facility", "hospital", "office", "theatre", "near emergency exit". The expression "location" is assumed to comprise also what is comprised by "position".

A simple position estimation is to determine the approximate position as inside the cell of the base station with best radio connection with the mobile terminal, i.e. the base station at the top of the neighbor list. In FIG. 1A, this means that it is possible to conclude with a certain probability that the mobile telephone 6 is situated within cell 4F. Using several entries in the neighbor list for different algorithms means that a better accuracy than the cell where the mobile phone is camping can be calculated. In FIG. 2, it is seen that base station 2G has the second position in the neighbor list. It is then very probable that the mobile telephone is situated in a 60° sector facing the cell 4G, marked with broken lines in FIG. 1A. Furthermore, since base station 2I is the third entry in the neighbor list, it is also probable that the mobile terminal 6 is situated in the half of the sector that is closest to cell 4I. Additional accuracy can furthermore be achieved by considering e.g. signal strength ratios etc.

The translation or calculation translating the neighbor list to a position and/or location estimate may take place either in the cellular system or in the terminal. If the position estimation takes place in the system, e.g. in a network server, the mobile terminal has to transmit the neighbor list or measurements corresponding to it to the radio base station. If the mobile terminal itself performs the estimation, the estimation can in a basic concept e.g. comprise a determination of a closest base station in form of e.g. a cell-ID. Such position information can in certain cases be enough to support many of the services based on position determination. However, if the actual geographic position is to be estimated, the mobile terminal first needs information about the particular surroundings. Such information should contain at least the known positions of the different base stations and could e.g. be deduced from instructions concerning base stations to be measured. Other information that may be specific to the location, building or surroundings may also be useful. Such specific information about e.g. a specific building could comprise map information, from which it is possible to exclude certain areas where a mobile cannot be located from the position determination. It is e.g. obvious that a mobile terminal can not be located within a solid wall, and it is most likely that the mobile is not hovering in the air 10 meters above the floor.

Indoors coverage in cellular systems is often of a lower quality than outdoors. Therefore, many larger buildings have their own local cell or cells. A typical prior art system is illustrated in FIG. 3. One single base station 8 serves, via a common antenna cable 17, a distributed antenna system comprising a number of antennas 14 distributed over the indoors area. A repeater 12 can be present in order to enhance the signals during distribution. Since all antennas provides the same information, a mobile terminal 6 experiences all antennas 14 together as one transmitting system, being associated with one single cell 4. Furthermore, since the mobile terminal 6 is unaware of which antenna it is actually communicating with, refined position estimation as described above is less likely to operate well. One way to improve position estimation accuracy is to provide smaller cells.

Distributed antenna systems as well as leaking cable systems and subsystems that are fed by a repeater or any other active component are assumed to be particularly well suited for implementing the present invention. The terms "antenna" and "transmitting entity" are normally used both for an antenna in a distributed antenna system, but also for a section of a leaking cable on a leaking cable antenna. However, the present technology is applicable to all possible types of antenna systems.

The typically bad connections to the base stations for the outdoor coverage, in combination with an environment with a lot of fading, also makes it difficult to use base stations located outdoors for triangulation purposes. In some buildings that are spread over large areas (e.g. airports), repeaters are used. The cell then becomes even larger resulting in lower position estimation accuracy.

The accuracy of position estimation based on neighbor lists is basically proportional to the cell size. Smaller cells will in general enable more accurate and precise position estimations. However, cells are controlled by a base station, and base stations are generally very expensive. The functionalities required in a base station that are used for position estimation are, at least in methods where the base station not actively takes part in the positioning, very limited. In fact, if only control signals comprising base station identification data are transmitted from well-defined positions, this is enough for performing the positioning routines. In the present technology, a number of antennas or transmitting entities are connected to a common base station, but are associated with separate base station identification data.

As mentioned above, the present technology is applicable to most cellular communications networks. However, as also mentioned above, it is presently believed that it is particularly advantageous when applied to position estimation of mobile terminals located in a distributed antenna system, a leaking cable system or a sub-system fed by a repeater. The accuracy of the position determination method depends on e.g. the premises or environment where the invention is to be implemented and other pre-requisites as well as various customer requirements. However, a position accuracy of 20-50 meters is believed to be realistic. The technology could advantageously be used for positioning of mobile terminals located in indoors systems, underground railway systems (subways) and sub-systems connected to cellular macro systems, e.g. tunnels connected to a macro radio cell using a repeater.

A larger cell is divided into several smaller virtual cells. The virtual cells are together controlled by a single base station. This common base station controls the virtual cells to the same extent as an ordinary base station controls an ordinary cell. Much of the intelligence and functionalities in the base station to handle the connections to the mobile telephones can be shared by the virtual cells. The additional functionality that is needed is non-expensive in relation to the provision of separate base stations. Furthermore, by having a number of antennas connected to the same base station, the virtual cells can also share traffic carriers. An example embodiment of a radio network is schematically illustrated in FIG. 4a. Here, three antennas 14A-C are connected to a base station 8 by separate antenna cables 18. Each antenna 14A-C transmits control signals with separate virtual base station identification data on different broadcast channels, and each antenna 14A-C constitutes the center of a virtual cell. The base station 8 is further connected to a BSC via a connection 22.

The base station 8 has four transceivers 72A-D, handling one carrier frequency each. Three of them 72A-C are used for carriers comprising control signaling for a respective one of the three antennas 14A-C. The last transceiver 72D handles a carrier comprising only traffic data. The traffic data carrier can be utilized by any of the three antennas 14A-C. The transceiver outputs are connected to a multiplexor unit 74, in which one respective control signal carrier is multiplexed with the traffic data carrier and provided to one of the antennas 14A-C. Since the base station 8 has full control over all carriers, the sharing of the traffic carrier can be performed on a channel-to-channel basis. In such a way, the flexibility and dynamics in resource allocation is considerably improved, compared with a case where available resources are divided between different base stations in a static manner.

Figure 4B:
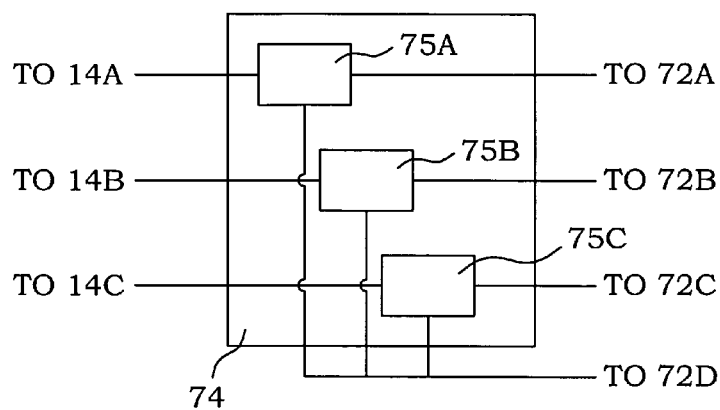

FIG. 4b illustrates a possible block scheme of the multiplexor unit 73 of FIG. 4a. The multiplexor unit 73 comprises three separate virtual cell multiplexor units 75A-C, which are provided with one control channel carrier each. The traffic channel carrier is provided to all of the virtual cell multiplexor units 75A-C.

The division of one cell into several virtual cells means that a mobile terminal within the coverage area of the antennas is provided with more exact information about its actual location. The control signaling from each of the antennas 14A-C can be measured and separated, and may provide a base for a more accurate position determination. At the same time, the number of base stations is not increased, only some additional functionalities are added. Reasonable resource allocation flexibility can be maintained by use of common traffic carriers.

Figure 5:
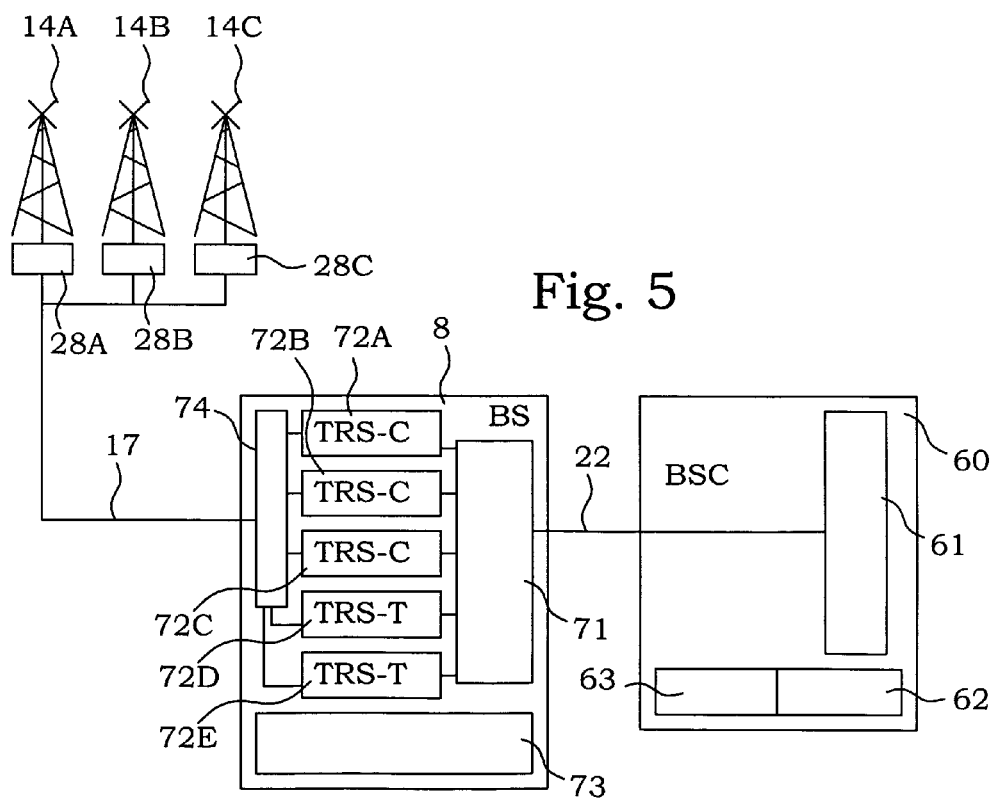
FIG. 5 is a schematic illustration of a part of a radio network having a distributed antenna system according to an example embodiment.

When creating the virtual cells as in FIG. 4a, a number of new antennas have typically to be provided. However, if implemented in e.g. a distributed antenna system, the already existing antennas can be utilized. In FIG. 5 an example embodiment having a distributed antenna system is schematically illustrated. Three antennas 14A-C of a distributed antenna system are connected by a common antenna cable 17 to the base station 8. As above, each antenna 14A-C transmits control signals with separate virtual base station identification data on different broadcast channels, and each antenna 14A-C constitutes the center of a virtual cell in a local virtual cellular network. The base station 8 has in this embodiment access to five carriers, of which three are used for control signaling to the three antennas, and two are used as pure traffic channel carriers. The base station 8 therefore has five transceivers 72A-E, where transceivers 72A-C are for control channel carriers and transceivers 72D-E are for traffic channel carriers. In the present embodiment, the base station 8 comprises a signal injector functionality within the multiplexor unit 74, which multiplexes control signals to all antennas 14A-C onto the common cable 17. At each antenna 14A-C, a signal selector 28A-C is provided, which filters the signals on the common cable 17 in order to extract signals of relevance for that particular antenna. In this embodiment, one carrier comprising control signals and both the traffic channel carriers are extracted at each antenna 14A-C. Embodiments of these devices will be described more in detail further below. The base station 8 comprises in such a configuration of a central unit and a number of satellite units 28A-C, but is still logically a base station 8.

Figure 6A:
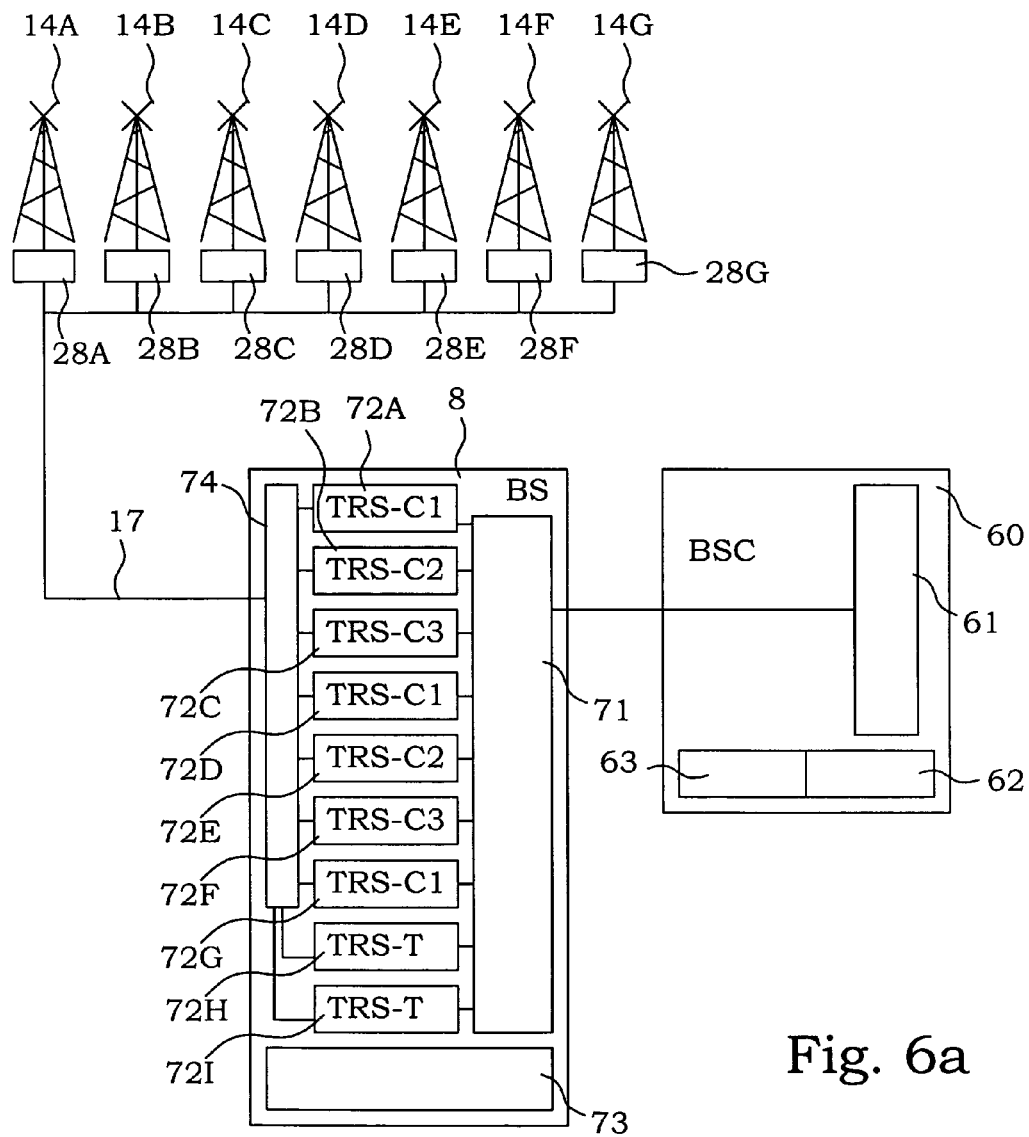
FIG. 6A is a schematic illustration of a part of a radio network having a distributed antenna system according to another example embodiment.

In FIG. 6A, another example embodiment is illustrated. In this embodiment, the virtual cell network comprises seven antennas 14A-G. The base station 8 has still only five carriers to use. The antennas are, however, in this embodiment arranged in such a way that carrier reuse can be applied. For instance, antennas 14A, 14D and 14G are separated in such a way that their transmissions do not disturb each other and therefore, these antennas can use the same carrier for distributing different data. The base station 8 comprises one transceiver 72A-72G for each antenna, responsible for control channel signaling, and two further transceivers 72H-I for traffic channel carriers. Transceivers 72A, 72D and 72G are intended for the same final carrier frequency C1, but separate control signals are provided. The multiplexor unit 74 has in such a case to multiplex the signals from the different control signal transceivers 72A-G in such a way that they can be distinguished and separated at the separators 28A-G at the antennas.

Figure 6B:
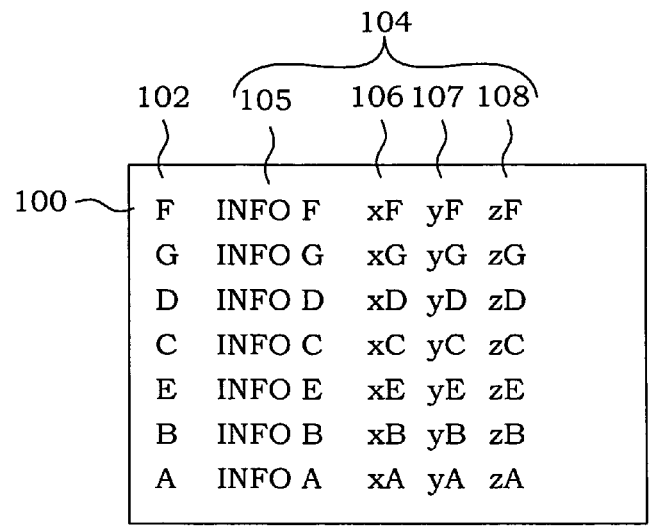
FIG. 6B is an illustration of a typical content of a neighbor list for the base station of FIG. 6A.

In the present embodiment, it is assumed to be a GSM system and the communication channels correspond to different carrier frequencies. The carrier frequencies C1 to C3 are provided with a further distinguishing base station ID, BSIC, unique for each antenna. In this respect, the antennas are operating as if they were connected to separate base stations, and the mobiles experience smaller virtual cells. A neighbor list 100 as in FIG. 6b could be the result. From this list, an improved position estimation can be obtained by state-of-the-art positioning routines. However, the virtual cells are controlled by a common base station 8 and have furthermore access to common traffic channel carriers.

Figure 7:
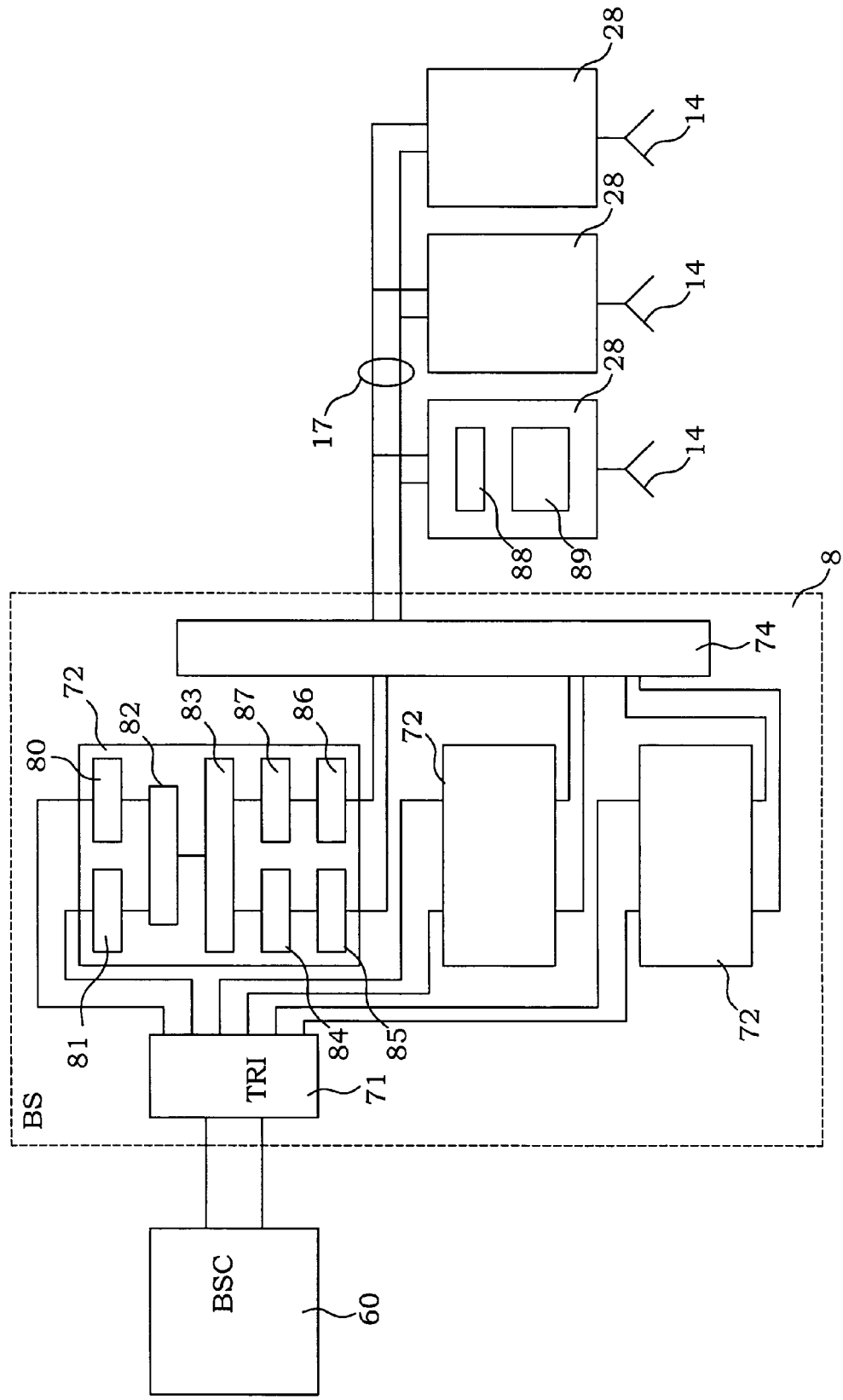
FIG. 7 is a block scheme of an embodiment of a radio base station.

The implementation of the functionalities of the base station can be made in many different manners. FIG. 7 illustrates a block diagram of one embodiment of a possible configuration. The base station 8 is connected to a BSC 60. The transceiver radio interface 71 directs signals to the different transceivers 72, depending on carrier frequency and BSIC. In this embodiment, only three transceivers 72 are present, but as anyone skilled in the art understands, there may be any number of transceivers 72. Each output, comprising a data traffic output and a control signal output or only a data traffic output depending on the utilization of the carrier in question, is connected to a respective transceiver unit 72. The control signals and data traffic are typically processed in separate error handling units 80, 81, before being encoded in a codec unit 82. The encoded signals are typically released in bursts and the encoded signals are thus processed in a burst handling unit 83. DL signals are multiplexed onto the available channels of the carrier in a channel multiplexor 84 and modulated in a modulator 85. UL traffic is demodulated in a demodulator 86 and demultiplexed in a channel demultiplexor 87.

In the present embodiment, a distributed antenna system is assumed, and all the used carriers are transferred to the antennas on one common antenna cable 17. The modulated signals to and from the transceiver unit 72 are multiplexed in the antenna transfer multiplexor unit 74, mentioned above. The antenna transfer multiplexor unit 74 operates preferably as a control signal injector (c.f. FIG. 5). Preferably, the control signal containing carriers are multiplexed in a manner that is easy to extract or filter out. The multiplexed signal is sent on the antenna cable 17 and reaches signal selectors 28 at each antenna 14. The signal selectors comprise a filter 88 or separating unit, which separates out the carrier containing the control signals intended for the virtual base station associated with that particular antenna and any common traffic carriers, if any. These separated carriers are demultiplexed in a demultiplexor 89 and modified into the proper characteristics for transmission. The signals of the separated carriers are then transferred as radio frequency electromagnetic waves by the antennas 14. The corresponding functionalities are present for UL communication in the signal selectors 28 and the multiplexing units 74, 89.

Figure 8:
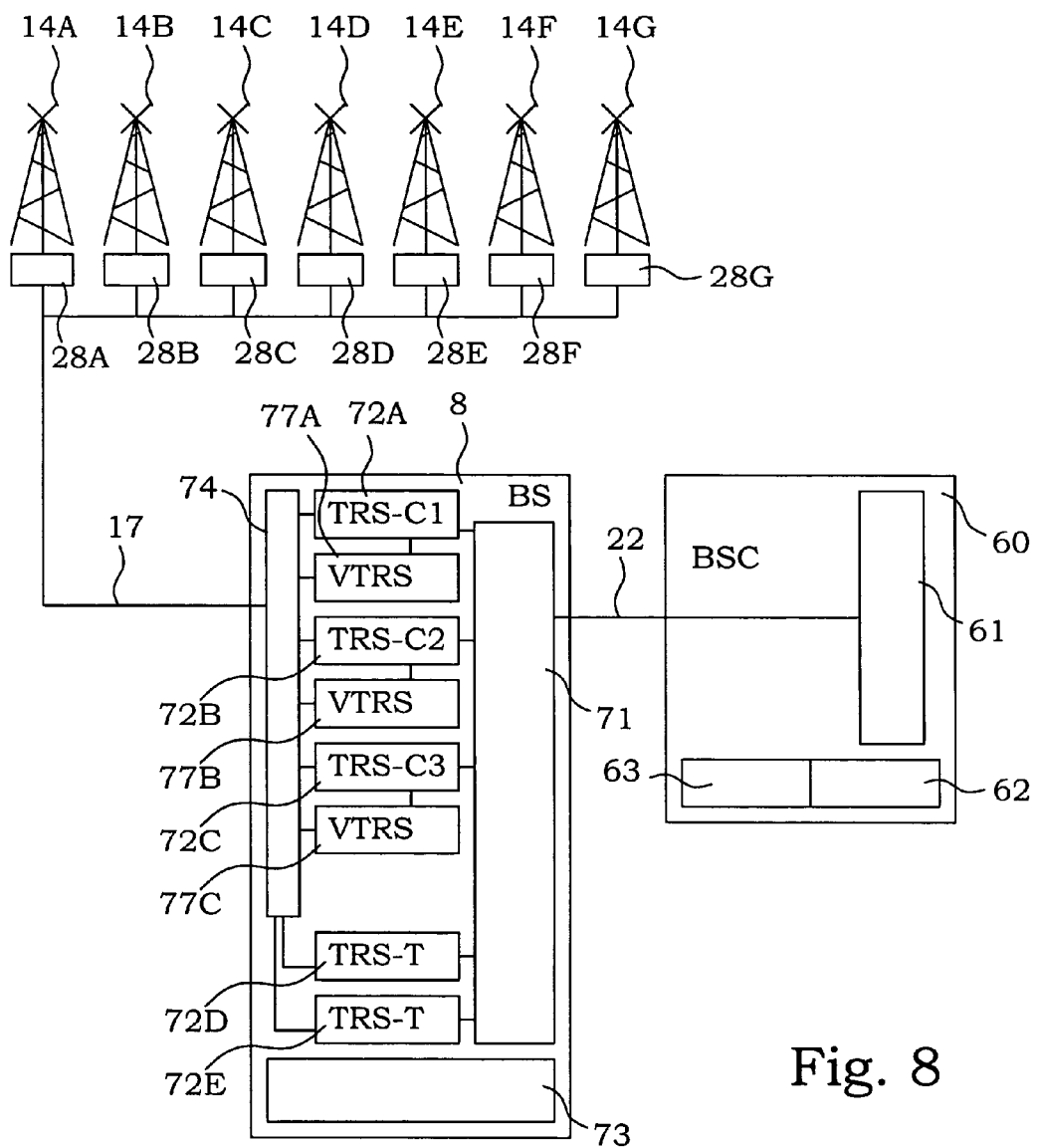
FIG. 8 is a schematic illustration of a part of a radio network having a distributed antenna system according to yet another example embodiment.

In FIG. 8, another example embodiment is illustrated. In this embodiment, the virtual cells also share the traffic channels on the carriers comprising the control channels. This means that all carriers are transmitted from all antennas, but that the control channel content varies from one antenna to another. The advantage is that the resource allocation dynamics is further increased. The main disadvantage is, however, that more sophisticated functionalities have to be included in the separator units in order to exchange control channel content.

In FIG. 8, the base station 8 comprises one "ordinary" transceiver 72A-E for each carrier. In addition, "virtual transceivers" 77A-C are provided, connected to the control channel transceivers 72A-C, which provides the content of the control channels to be transmitted from the different antennas 14A-G. This content is multiplexed together with the traffic data and provided to the different antennas. The separator units 28 separates out the control channel data intended for that particular antenna and includes this data into the data transmitted on the control channel carrier. Other control data, intended for other antennas are filtered out. The separator units 28 have to include fairly intelligent functionalities, since most of the functions normally carried out in the transceiver parts of the central base station have to be included, e.g. coding and multiplexing in different stages.

This embodiment will, however, probably give slightly higher positioning inaccuracy, since decoding of cell identity typically is performed less frequently than signal strength measurements, which means that the signal strength may be associated with an incorrect virtual cell identity during shorter periods. In many applications, the position accuracy will anyway be sufficient.

Figure 9:
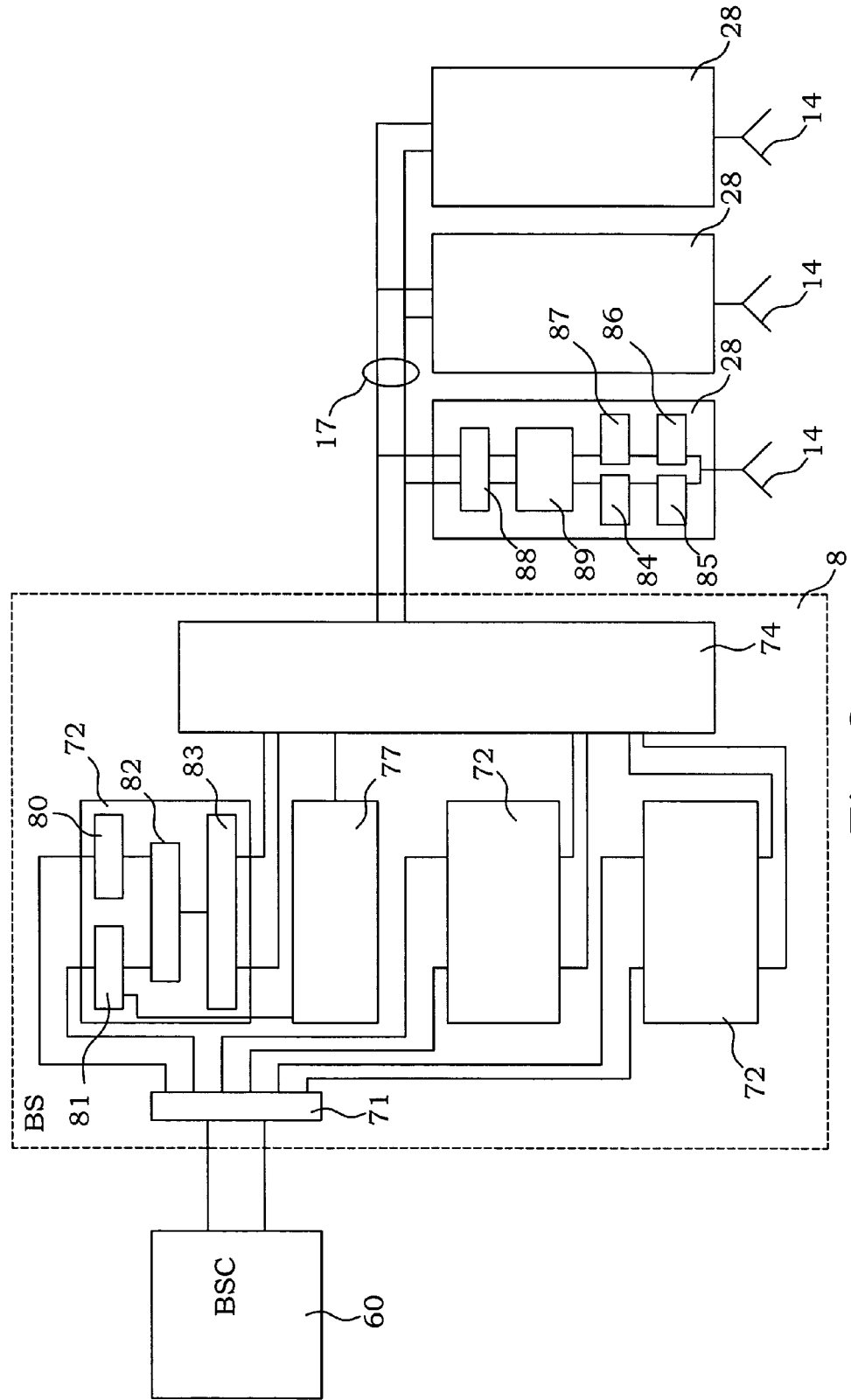
FIG. 9 is a block scheme of another example embodiment of a radio base station.

FIG. 9 illustrates another example embodiment of an implementation of a base station. Here some transceiver functionalities are distributed to the separator units 28, and this embodiment may be more suitable for implementing e.g. the system illustrated in FIG. 8. The BSC 60 is as usual connected to a transceiver radio interface 71 in the base station 8, and signals intended for the different carriers are switched to separate transceiver units 72. The transceiver units 72 are in an ordinary manner arranged for error handling, encoding and burst handling. The output from the burst handling unit 83 is, however, in this embodiment connected to the multiplexor unit 74. The signals intended for the different virtual network carriers are multiplexed in the multiplexor 74 and transferred onto the common antenna cable 17. The signal selectors 28 in this embodiment are in addition to filtering 88 and demultiplexing 89 units also provided with a channel multiplexor 84, a modulator unit 85, a demodulator unit 86 and a channel demultiplexor 87, which normally are situated within the main base station 8.

Many other implementations are possible, and the present technology should not be constrained only to the exemplifying embodiments, but instead entirely defined by the appended patent claims.

In most of the above embodiments, a distributed antenna system has been used as a model system. However, also leaking cable systems and/or systems comprising repeaters are suitable for the present invention to be implemented in.

Figure 10:
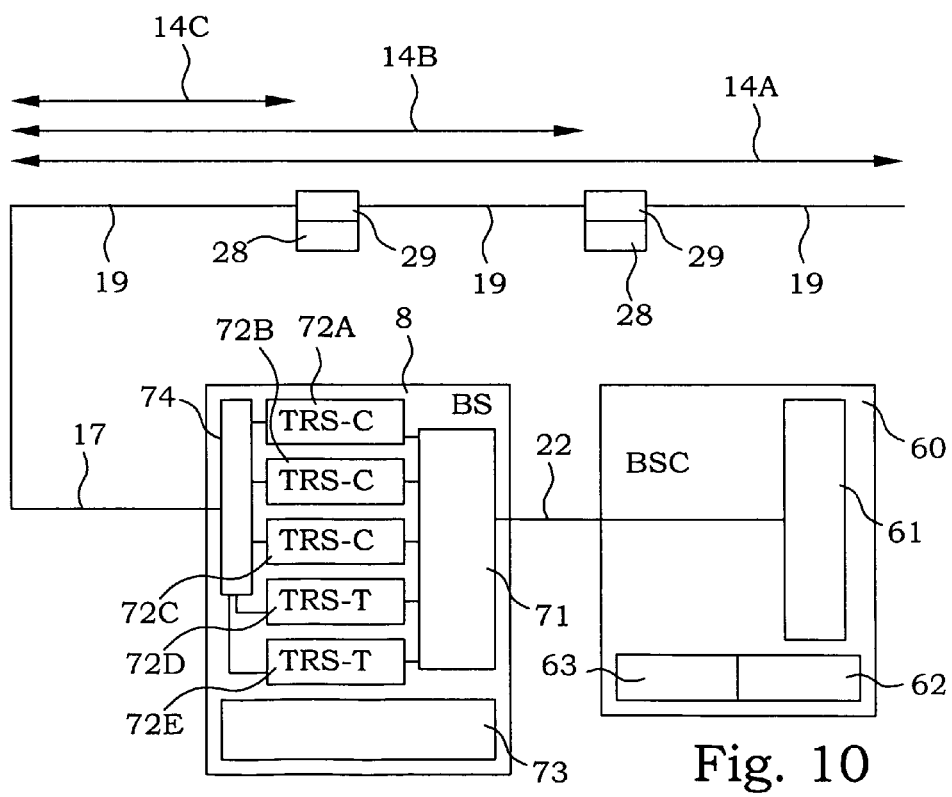
FIG. 10 is a schematic illustration of a part of a radio network having a leaking cable antenna system with repeaters according to an example embodiment.

FIG. 10 illustrates such a system, comprising a leaking cable 19 as antenna system. A repeater 29 can easily be provided with a separator unit 28, similar to the ones in the earlier embodiments. The separator unit 28 is then arranged to let only a part of the control signals to pass to the part of the antenna system being situated further downlink. The portion of the antenna system downlink from the repeater 29 will then provide a different set of control signals than uplink to the repeater 29. This difference can be used as a position indication with improved accuracy.

In particular, the entire leaking cable has access to a first control signal and constitutes a first "antenna" 14A associated with a first virtual cell. Another control signal is filtered away at the second repeater 29 and is thus only available from the first two parts of the leaking cable, which then constitutes a second "antenna" 14B associated with a second virtual cell. Finally, a third control signal is filtered away already at the first repeater 29 and the "antenna" 14C associated with a third virtual cell thus comprises only the first third of the leaking cable 19.

When managing such a system, it may be preferable to introduce priority levels for the different virtual cells. By selecting the virtual cell of antenna 14C with a higher priority than the virtual cells of antennas 14B and 14A, most mobile stations located within the virtual cell associated with antenna 14C will communicate through antenna 14C. Likewise, by giving the virtual cell associated with 14B a higher priority than 14A, mobile stations in the vicinity of the middle part of the leaking cable will communicate through antenna 14B. In such a way, the traffic load of the different antennas can be distributed in a more homogenous manner.

Figure 11:
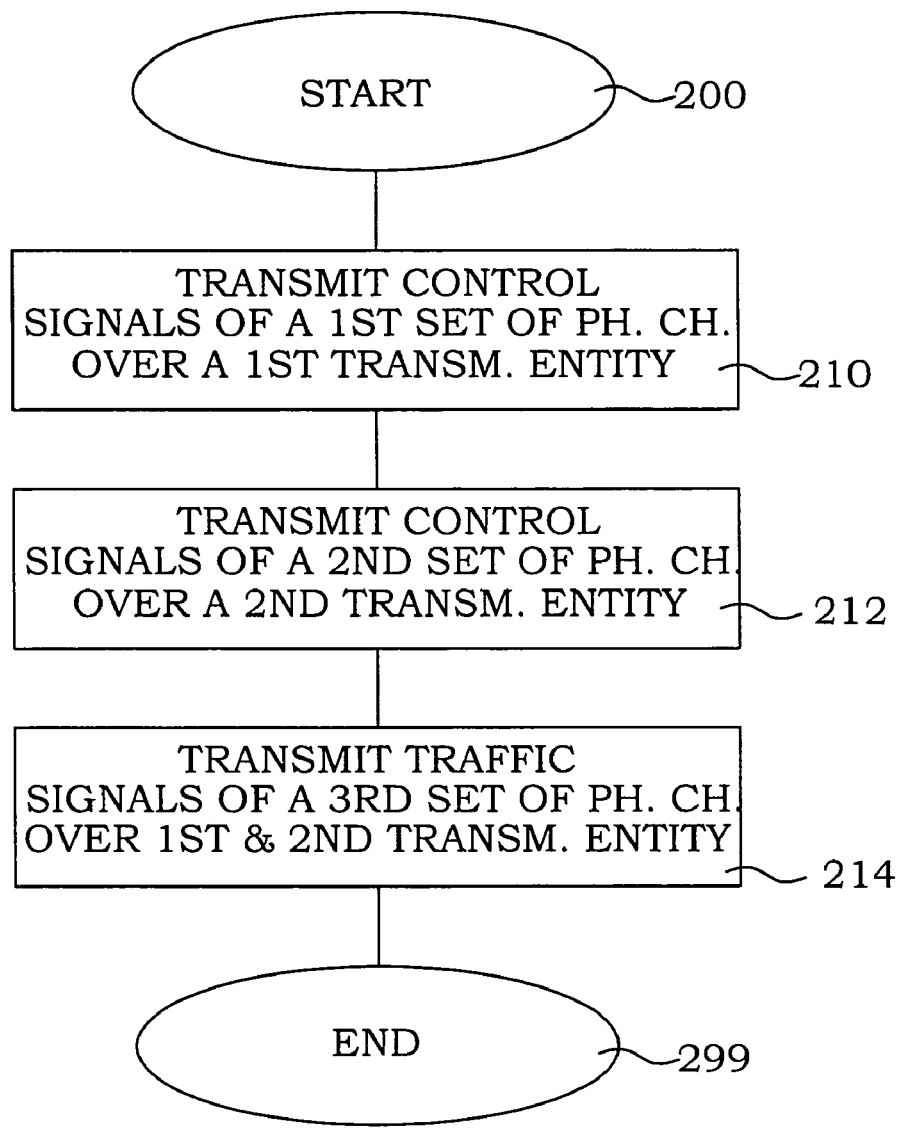
FIG. 11 is a flow diagram illustrating the main steps in an example embodiment.

The main steps of an example embodiment of a method are illustrated in FIG. 11. The procedure starts in step 200. In step 210, control signals of a first set of physical channels are transmitted over a first transmission entity. In step 212, control signals of a second set of physical channels are transmitted over a second transmission entity. Finally, in step 214, traffic signals of a third set of physical channels are transmitted over both the first and the second transmission entity. The procedure is ended in step 299.

It will be understood by those skilled in the art that various modifications and changes may be made and the scope of the invention is defined by the appended claims.

The invention claimed is:

1. Radio access network, comprising
radio access station; and
a first and a second transmitting entity controlled by the radio access station;
the radio access station being arranged to allocate a control channel in a first set of physical channels for the first transmitting entity;
the radio access station being arranged to allocate a control channel in a second set of physical channels, exclusive to the first set of physical channels, for the second transmitting entity;
the control channels of the first and second sets of physical channels including different radio access station identification data;
said radio access station identification data being associated with a respective position;
the radio access station being arranged to allocate a first traffic channel in a third set of physical channels, exclusive to both the first and second sets of physical channels, for the first transmitting entity and a second traffic channel in the third set of physical channels for the second transmitting entity;
the radio access station being arranged not to allocate any control channels for said first transmitting entity and said second transmitting entity to said third set of physical channels.

2. Radio access network according to claim 1, wherein the transmitting entities are connected to the radio access station by a common cable.

3. Radio access network according to claim 1, wherein the first and second transmitting entities are components in a distributed antenna system or a leaking cable antenna.

4. Radio access network according to claim 1, wherein the radio access station is a base station.

5. Radio access network according to claim 4, further comprising positioning means, estimating positions of mobile terminals based on radio access station identification data received by the mobile terminals.

6. Radio access network according to claim 5, wherein the position estimation is based on a neighbor list of the mobile terminals.

7. Radio access network according to claim 1, further comprising a third transmitting entity, whereby the radio access station being arranged to allocate a control channel in the first set of physical channels for the third transmitting entity, comprising different radio access identification data compared with the first transmitting entity.

8. Radio access network according to claim 7, wherein the radio access station being arranged to allocate a first traffic channel in the first set of physical channels for the first transmitting entity and a second traffic channel in the first set of physical channels for the third transmitting entity.

9. Radio access network according to claim 1, wherein the radio access station comprises a broadcast control signal injector and at least one of the first and second transmitting entities comprises a control signal selector.

10. Radio access network according to the claim 9, wherein the control signal selector is arranged to select entire sets of physical channels comprising control channels.

11. Radio access network according to the claim 9, wherein the control signal selector is arranged to select separate control channels.

12. Radio access station, comprising
an antenna connection to a first and a second transmitting entity controlled by the radio access station;
radio channel allocation circuitry arranged to: allocate a control channel in a first set of physical channels for the first transmitting entity and allocate a control channel in a second set of physical channels, exclusive to the first set of physical channels, for the second transmitting entity;
the control channels of the first and second sets of physical channels including different radio access station identification data;
said radio access station identification data being associated with a respective position;
the radio allocation circuitry being arranged to allocate a first traffic channel in a third set of physical channels, exclusive to both the first and second sets of physical channels, for the first transmitting entity and a second traffic channel in the third set of physical channels for the second transmitting entity; and
the radio allocation circuitry being arranged not to allocate any control channels for said first transmitting entity and said second transmitting entity to said third set of physical channels.

13. Radio access station according to claim 12, wherein the radio access station is a base station.

14. Radio access station according to claim 12, further comprising positioning circuitry for estimating positions of mobile terminals based on radio access station identification data received by the mobile terminals.

15. Radio access station according to claim 14, wherein the position estimation is based on a neighbor list of the mobile terminals.

16. Radio access station according to claim 12, wherein the radio channel allocation circuitry is further arranged to allocate a control channel in the first set of physical channels for the third transmitting entity, comprising different radio access identification data compared with the first transmitting entity.

17. Radio access station according to claim 16, wherein the radio channel allocation circuitry is further arranged to allocate a first traffic channel in the first set of physical channels for the first transmitting entity and a second traffic channel in the first set of physical channels for the third transmitting entity.

18. Radio access station according to claim 12, further comprising a broadcast control signal injector.

19. Radio access station according to the claim 18, wherein the control signal injector is arranged to inject entire sets of physical channels comprising control channels.

20. Radio access station according to the claim 19, wherein the control signal injector is arranged to inject signals representing separate control channels.

21. Method for managing a part of a mobile communications network, comprising the steps of:
transmitting control signals of a first set of physical channels over a first transmission entity;
transmitting control signals of a second set of physical channels, exclusive to the first set of physical channels, over a second transmission entity; and
the control channels of the first and second sets of physical channels including different radio access station identification data;
said radio access station identification data being associated with a respective position;
transmitting traffic signals of a third set of physical channels, exclusive to both the first and second sets of physical channels, over both the first and the second transmission entity;
the third set of physical channels having no control signals.

22. Method according to claim 21, wherein the radio access station is a box station.

23. Method according to claim 21, comprising the further step of estimating positions of mobile terminals based on radio access station identification data received by the mobile terminals.

24. Method according to claim 23, wherein the position estimation is based on a neighbor list of the mobile terminals.

25. Method according to claim 21, comprising the further steps of:
multiplexing signals to the first, second and third sets of physical channels onto a single communication link;
transferring the multiplexed signal to the first and second transmission entities;
demultiplexing the transferred signal at at least one of the first and second transmission entities; and
selecting one of the first and second control signals at the at least one of the first and second transmission entities.

26. Method according to claim 25, wherein the step of multiplexing comprises multiplexing of portions of the first, second and/or third sets of physical channels, where the method comprises the further step of combining the selected control signals of the demultiplexed transferred signal into the first, second and/or third sets of physical channels.

* * * * *